(12) United States Patent
Rengaraju et al.

(10) Patent No.: US 11,297,387 B2
(45) Date of Patent: Apr. 5, 2022

(54) SYSTEMS AND METHODS FOR DIGITAL VIDEO RECORDING OF INTERNET PROTOCOL CONTENT

(71) Applicant: Verizon Patent and Licensing Inc., Arlington, VA (US)

(72) Inventors: Ganesan Rengaraju, Irving, TX (US); Ananthanarayanan Subramanian, Lewisville, TX (US); Srinivasulu Ganipineni, Frisco, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/580,633

(22) Filed: Sep. 24, 2019

(65) Prior Publication Data
US 2021/0092485 A1 Mar. 25, 2021

(51) Int. Cl.
*H04N 21/4627* (2011.01)
*H04N 21/433* (2011.01)
*H04N 21/2387* (2011.01)
*H04N 21/858* (2011.01)
*H04N 21/4405* (2011.01)

(52) U.S. Cl.
CPC ..... *H04N 21/4627* (2013.01); *H04N 21/2387* (2013.01); *H04N 21/4334* (2013.01); *H04N 21/4405* (2013.01); *H04N 21/8586* (2013.01)

(58) Field of Classification Search
CPC ........... H04N 21/4627; H04N 21/4334; H04N 21/2387; H04N 21/8586; H04N 21/4405; H04N 21/63345; H04N 2005/91364; H04N 5/913; H04N 21/2541; H04N 21/4622
See application file for complete search history.

(56) References Cited

U.S. PATENT DOCUMENTS

| | | | |
|---|---|---|---|
| 8,739,196 B2 | 5/2014 | Yao | |
| 9,521,386 B2 | 12/2016 | Beattie et al. | |
| 9,767,317 B1* | 9/2017 | Chakrovorthy | G06F 21/71 |
| 9,800,933 B1* | 10/2017 | Strothmann | H04N 5/445 |
| 10,743,051 B1 | 8/2020 | Reed et al. | |
| 2009/0031419 A1* | 1/2009 | Laksono | H04N 21/6175 726/21 |

(Continued)

OTHER PUBLICATIONS

Widevine website, https://www.widevine.com/solutions/shaka-player, Sep. 18, 2018 (Year: 2018).*

*Primary Examiner* — John R Schnurr

(57) ABSTRACT

A media client device, including a memory and capable of processing Quadrature Amplitude Modulation (QAM) channels and IP channels, may receive a recording request to record content on an Internet Protocol (IP) channel. The media client device may provide, to a first device, a source Universal Resource Locator (URL) corresponding to the content, and receive, from the first device, encrypted content (e.g., an encrypted version of the content). The media client device may store, in the memory, the encrypted content, and provide, to a second device, information regarding the encrypted content to permit the second device to generate and store a license and a key. The media client device may receive a playback request to play the content, and obtain, from the second device, the license and the key. The media client device may decrypt, using the license and the key, the stored, encrypted content to obtain the content.

20 Claims, 10 Drawing Sheets

(56) References Cited

U.S. PATENT DOCUMENTS

| | | | |
|---|---|---|---|
| 2009/0055866 A1 | 2/2009 | Song et al. | |
| 2009/0313663 A1* | 12/2009 | Kitazato | H04N 21/6408 |
| | | | 725/87 |
| 2011/0047566 A1* | 2/2011 | Matuchniak | H04L 65/1083 |
| | | | 725/29 |
| 2012/0011557 A1* | 1/2012 | Mathews | H04N 21/25833 |
| | | | 725/131 |
| 2012/0158985 A1* | 6/2012 | Patten | H04L 65/608 |
| | | | 709/231 |
| 2014/0250471 A1* | 9/2014 | Guerra | H04N 21/43615 |
| | | | 725/82 |
| 2014/0310518 A1* | 10/2014 | Giladi | H04L 63/0428 |
| | | | 713/165 |
| 2015/0003614 A1* | 1/2015 | Cocchi | H04N 21/6125 |
| | | | 380/281 |
| 2015/0046939 A1* | 2/2015 | Oliver | H04N 21/25875 |
| | | | 725/27 |
| 2015/0082351 A1 | 3/2015 | Kashyap et al. | |
| 2016/0198214 A1* | 7/2016 | Levy | H04N 21/4345 |
| | | | 725/43 |
| 2016/0212483 A1* | 7/2016 | Ansley | H04N 21/234309 |
| 2018/0041891 A1* | 2/2018 | Bleyl | H04W 8/18 |
| 2019/0207691 A1* | 7/2019 | Yamagishi | H04H 60/73 |
| 2019/0215542 A1 | 7/2019 | Gandhi et al. | |
| 2019/0253742 A1* | 8/2019 | Garten | H04N 21/4402 |
| 2020/0037029 A1 | 1/2020 | He et al. | |

\* cited by examiner

SYSTEMS AND METHODS FOR DIGITAL VIDEO RECORDING OF INTERNET PROTOCOL CONTENT

BACKGROUND

Quadrature Amplitude Modulation (QAM) is the standard format by which digital cable television channels are encoded and transmitted via cable television service providers. In cable systems, a QAM tuner is linked to a cable in a manner that is equivalent to an Advanced Television Systems Committee (ATSC) tuner which is required to receive over-the-air (OTA) digital channels broadcast by local television stations when attached to an antenna.

DETAILED DESCRIPTION OF PREFERRED EMBODIMENTS

Figure 1A:
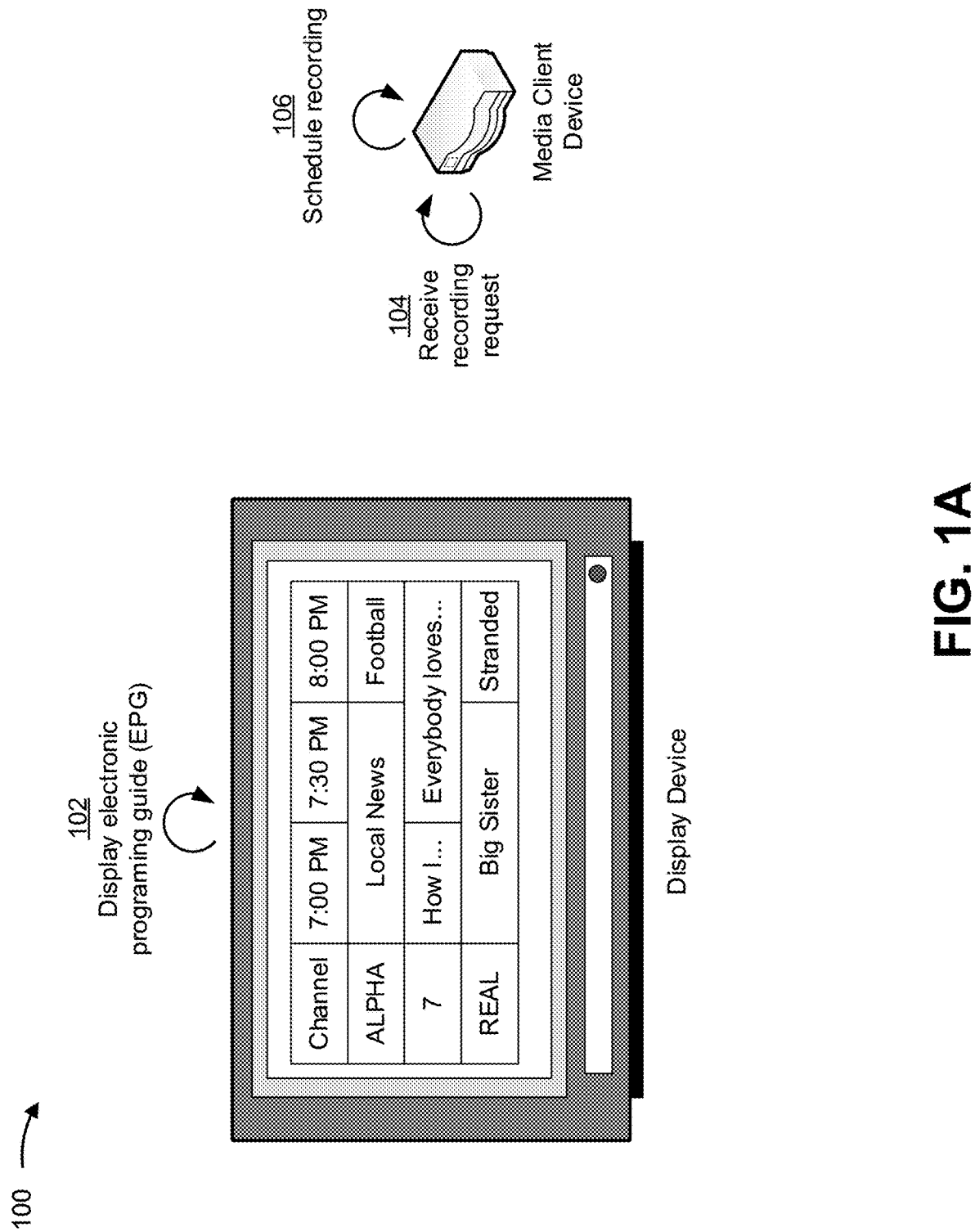
FIGS. 1A-1G are diagrams of one or more example implementations described herein.

The following detailed description of example implementations refers to the accompanying drawings. The same reference numbers in different drawings may identify the same or similar elements.

Television service providers may deliver digital television channels (e.g., linear video transmissions) to users via QAM channels or via IP channels. For QAM-based television, the television service provider may transmit QAM signals over a network to a set-top box (STB) at a user's location (e.g., the user's residence, the user's place of business, and/or the like). The STB may receive a request to record content provided via a QAM channel, schedule the recording, and, at the scheduled time, receive encrypted content via the QAM channel, decrypt the content, and store the unencrypted content in memory of the STB.

For IP television (IPTV), the television service provider may provide digital television channels over IP networks to the STB at the user's location. The STB may receive a request to record content provided via an IP channel, and the STB may, using a cloud-based system, store encrypted content on a remote server with a key to decrypt the content. The cloud-based system stores encrypted content, rather than unencrypted content, so that the content cannot be intercepted when transmitted to the STB for playback. The cloud-based storage system consumes server space to store the recorded content. Additionally, digital rights management (DRM) rules require that each user have a separate copy of the content stored, which compounds the consumption of server space when STBs for additional users store the same content on the cloud-based storage system. Furthermore, the cloud-based storage system consumes network resources because the IP content is first streamed from a content delivery network (CDN) to the cloud-based storage system and then streamed from the cloud-based storage system to the STB.

Some implementations described herein provide a media client device that allows a user to record, to memory in the media client device, content from both QAM channels and IP channels. In some implementations, the media client device may be capable of processing QAM channels and IP channels, and may receive an electronic programming guide (EPG) which lists the available digital television channels including QAM channels and IP channels. The media client device may provide an interactive media guide based on the EPG to a display device (e.g., a television, a monitor, a projector, and/or the like) for display, and receive a record request (e.g., from the display device, from a remote control associated with the media client device and/or the display device, from a user interface associated with the media client device and/or the display device, and/or the like) to record content on an IP channel. The media client device (e.g., using an application running in middleware of the media client device and/or the like) may, based on the record request, schedule recording of the content. Based on a trigger to begin recording (e.g., a scheduled time and/or the like), the media client device may request a source URL from a media server device (e.g., a middleware server and/or the like), where the request includes a channel identifier for the IP channel and a device identifier for the media client device.

The media server device may verify that the media client device is permitted access to the channel and/or the content on the channel based on the channel identifier and the device identifier. The media server device may then provide a source URL to the media client device. In some implementations, the media server device may provide, to the media client device, a tokenized source URL that is uniquely tokenized to the media client device (e.g., based on a device token specific to the media client device, the device identifier of the media client device, and/or the like).

The media client device may, using a browser application, provide the source URL to the CDN via an IP communication session and may receive content segments associated with the IP channel via the IP communication session. The media client device may use a client (e.g., a Motion Picture Experts Group—Dynamic Adaptive Streaming of Hypertext Transfer Protocol (MPEG-DASH) client, and/or the like) and/or a player (e.g., a dashjs player, a Shaka player, and/or the like) embedded in the browser to receive an encrypted version of the content on the IP channel.

The media client device may store the encrypted version of the content in memory (e.g., in a hard drive and/or the like) of the media client device, and provide, to a digital rights management (DRM) server device, the device identifier for the media client device and information regarding the encrypted version of the content (e.g., a Media Presentation Description (MPD) extensible markup language (XML) document for the encrypted version of the content and/or the like). The DRM server device may, based on the device identifier and the information regarding the encrypted version of the content, generate and store a license and a key to decrypt the encrypted version of the content.

The media client device may provide, to the display device and for display, a list of recorded content, and receive a playback request (e.g., from the display device, from a remote control associated with the media client device and/or the display device, from a user interface associated with the media client device and/or the display device, and/or the like) to play the content. The media client device may, based on the playback request, obtain the license and the key from the DRM server device, and may, using the license and the key, decrypt the encrypted version of the content stored in the memory to obtain the content. The media client device may provide the content to the display device for display.

In this way, the media client device may store content from IP channels on the memory in the media client device, which conserves server space consumed by the cloud-based storage system storing recorded content. Furthermore, the media client device conserves network resources consumed when the cloud-based storage system streams content onto the server space for storage and then streams content out of the server space to the STB for playback. In some implementations, the media client device has expanded capability and improved operations as compared to STBs. Additionally, or alternatively, operating the media client device, as compared to an STB and the cloud-based storage system, is more efficient and conserves computing resources (e.g., processing resources, memory resources, power resources, communication resources, and/or the like) and/or network resources.

FIGS. 1A-1G are diagrams of one or more example implementations 100 described herein. For example, as shown in FIGS. 1A-1G, example implementation(s) 100 includes a media client device, a display device, a media server device, a content delivery network, and/or a digital rights management server device.

In some implementations, a television service provider may install and/or otherwise provide the media client device to a user (e.g., a customer, an individual, a business, and/or the like) at a location of the user (e.g., a house, an apartment, a business office, and/or the like). The media client device may connect to the display device (e.g., via a High Definition Multimedia Interface (HDMI) cable, a component video cable, a Radio Corporation of America (RCA) cable, a Super Video (S-Video) cable, a digital optical cable, a coaxial cable, a wireless connection, and/or the like). The media client device may also connect to a router, which may connect through an optical network termination (ONT) to an optical network over which the television service provider may transmit signals (e.g., QAM signals, IP signals, and/or the like) providing video broadcast services, IP services, Video-On-Demand (VoD) services, and/or the like. Additionally, or alternatively, the media client device may connect to another media client device (e.g., via an in-home network, a business network, a multimedia over coax alliance (MoCA), and/or the like) and/or the router to connect to the optical network.

In some implementations, the media client device may connect through the optical network to an EPG server device (e.g., when the media client device boots, based on a request for an EPG from the user, and/or the like) and receive an EPG from the EPG server device. In some implementations, the EPG server device may generate an EPG that includes channel identifiers for QAM channels and IP channels. The EPG server device may generate the EPG based on information provided by the television service provider, information regarding the media client device (e.g., a device identifier, a version of software installed on the media client device, and/or the like), a location of the media client device, a current date and/or time, and/or the like.

In some implementations, the media client device may receive information from the EPG server device via a middleware layer of software running on the media client device. For example, the media client device may include a platform layer, a middleware layer, and/or an application layer. The platform layer may communicate and/or interface with the hardware of the media client device and the middleware layer. The middleware layer may communicate with the platform layer and the application layer. The application layer may include one or more applications (e.g., apps, web browsers, and/or the like).

As shown in FIG. 1A, and by reference number 102, the display device may display the EPG. In some implementations, the displayed EPG may include a grid that provides information regarding content available on QAM channels and IP channels at a given time. For example, and as shown in FIG. 1A, the displayed EPG may indicate that the local news is available on channel "ALPHA" from 7:00 PM to 8:00 PM. In this way, the display device, using the EPG, may provide information to the user regarding content available on the channels in the future.

As shown in FIG. 1A, and by reference number 104, the media client device may receive a recording request. In some implementations, the media client device may receive the recording request via an input button (e.g., a physical button on the media client device, a physical button on a remote control associated with the media client device, a user interface associated with the media client device and/or the display device, and/or the like), a voice command (e.g., received via a microphone and/or the like), and/or the like. For example, the user may select content from the displayed EPG using a remote control and press a button (e.g., labeled "Record," "REC," and/or the like), and the remote control may communicate the selection to the media client device. In some implementations, the recording request may include or be used to identify a channel identifier (channel ID), a start time at which the selected content begins, a duration of the selected content, an end time at which the selected content ends, and/or the like.

In some implementations, the display device may receive the recording request via an input button (e.g., a physical button on the display device, a physical button on a remote control associated with the display device, a virtual button on a touchscreen of the display device, a user interface, and/or the like), a voice command (e.g., received via a microphone and/or the like), and/or the like. The display device may provide the recording request to the media client device.

A shown in FIG. 1A, and by reference number 106, the media client device may schedule a recording based on the recording request. In some implementations, the media client device may schedule the recording using a digital video recording (DVR) application in the middleware of the media client device. For example, the media client device (e.g., via the DVR application) may schedule the recording by generating a start trigger to begin recording based on the start time associated with the content to be recorded, and a stop trigger to end recording based on the end time associated with the content to be recorded. In some implementations, the media client device, when generating the start trigger and/or the stop trigger, may include an initial buffer period before the start time such that recording begins before the start time and/or an ending buffer period after the end time such that recording ends after the end time.

Figure 1B:
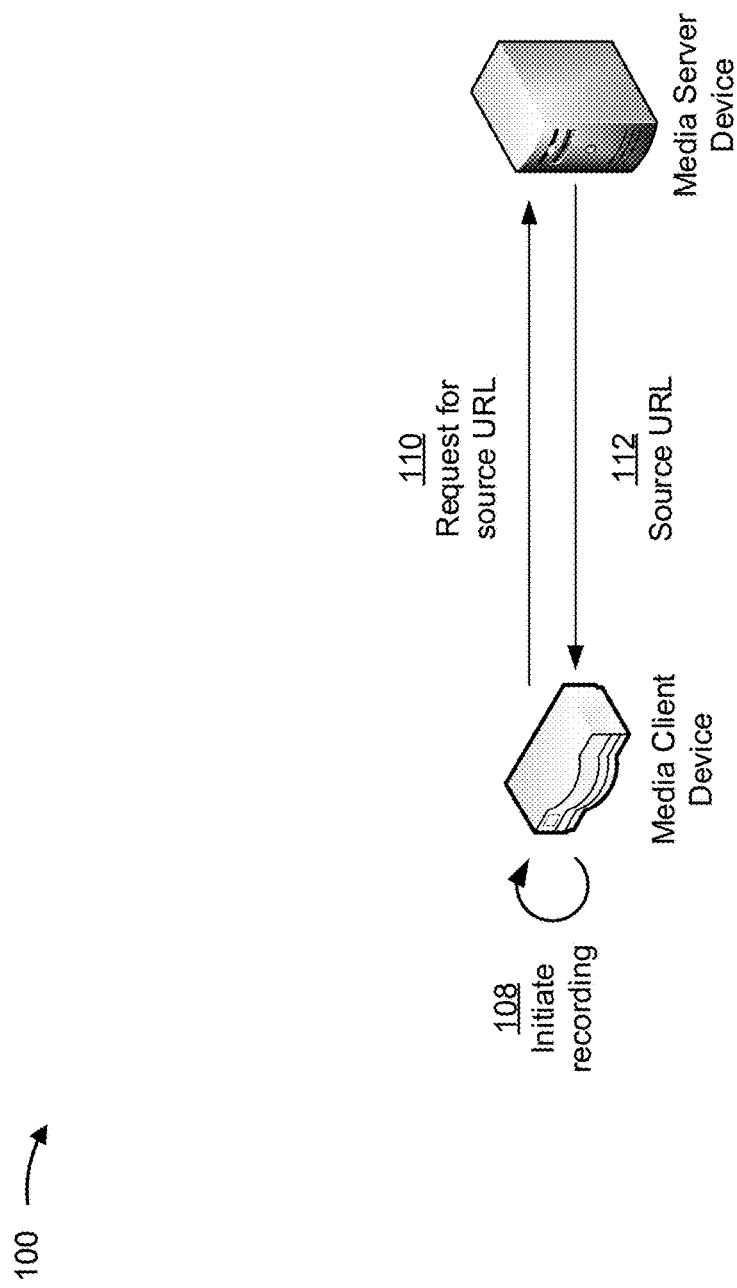

As shown in FIG. 1B, and by reference number 108, the media client device may initiate the recording. For example, the media client device may detect that a current date/time matches a start date/time of a scheduled recording, and may trigger the initiation of the recording of the scheduled content.

As shown in FIG. 1B, and by reference number 110, the media client device (e.g., via the middleware layer) may provide, based on the recording request, a request for a source URL to the media server device (e.g., a middleware server device, and/or the like). The request for the source URL may include the channel identifier and the device identifier of the media client device. In some implementations, the device identifier may include a serial number of the media client device, an account identifier associated with the user, a unique identifier and/or the like used by the television service provider to identify media client device, and/or the like.

In some implementations, the media server device may process the channel identifier and the device identifier to verify that the media client device is authorized to access the channel identified by the recording request and/or content provided on the channel. In some implementations, the media server device compares the channel identifier and/or the device identifier with information in a data structure (e.g., a data structure maintained by the television service provider) to verify access for the media client device. For example, the media server device may determine whether a package of channels purchased and/or subscribed to by the user of the media client device includes the channel, whether a promotion permits the user of the media client device to access the channel, and/or the like. In the description to follow, it will be assumed that the media client device has been verified to have access to the channel.

As shown in FIG. 1B, and by reference number 112, the media server device may provide, to the media client device, a source URL corresponding to the channel identifier and an indication of whether the channel is a QAM channel or an IP channel. In some implementations, the media server device may provide, to the media client device, a tokenized source URL that is uniquely tokenized to the media client device (e.g., based on a device token specific to the media client device, the device identifier of the media client device, and/or the like). For example, the media server device may permit the tokenized source URL to play for a given duration of time (e.g., an hour, a duration of the content on the channel, and/or the like) to maintain the ability of the media client device to access the IP channel. In this way, the media server device may, using a tokenized source URL that is uniquely tokenized to the media client device, protect a stream of content on the channel from unauthorized access. In some implementations, the media client device may de-tokenize the tokenized source URL to obtain the source URL. For example, the media client device may use a token unique to the media client device to de-tokenize the tokenized source URL to obtain the source URL.

In some implementations, the source URL may include data indicating whether the source URL corresponds to an IP channel. For example, the data may be a Boolean flag that returns a value of "True" if the source URL corresponds to an IP channel and "False" if the source URL corresponds to a QAM channel, or vice versa. In some implementations, the data indicating whether the source URL corresponds to an IP channel may be any type and/or form of data and may be included in the source URL, embedded in the source URL, provided with the source URL (e.g., as an additional piece of data), and/or the like.

In some implementations, the media client device (e.g., via the middleware layer) may receive the source URL, and may process the source URL to determine whether the selected channel is a QAM channel or an IP channel. For example, the media client device may determine whether the selected channel is a QAM channel or an IP channel based on the flag provided by the media server device. If the flag indicates that the source URL corresponds to a QAM channel, the media client device may initiate QAM channel display by receiving content in a QAM signal via the QAM channel, demodulating the QAM signal, de-encrypting the QAM signal, converting the QAM signal to an audio signal and/or a video signal, and storing the audio signal and/or the video signal in memory. In some implementations, the middleware layer of the media client device may initiate, coordinate, and/or control QAM channel recording and/or display. For example, the media client device may include one or more QAM tuners and the middleware layer of the media client device may use the one or more QAM tuners to initiate, coordinate, and/or control QAM channel recording and/or display.

In some implementations, the media client device (e.g., via the middleware layer) may determine that the channel is an IP channel based on the flag provided by the media server device and (e.g., using the application layer) initiate, coordinate, and/or control streaming of the IP channel. In some implementations, the media client device may initiate, coordinate, and/or control streaming of the IP channel by opening a browser session. For example, the media client device may open a browser session using a browser (e.g., an application used to access a website, and/or the like), an application, and/or the like. In some implementations, the browser session may establish an IP communication session between the media client device and one or more servers.

Figure 1C:
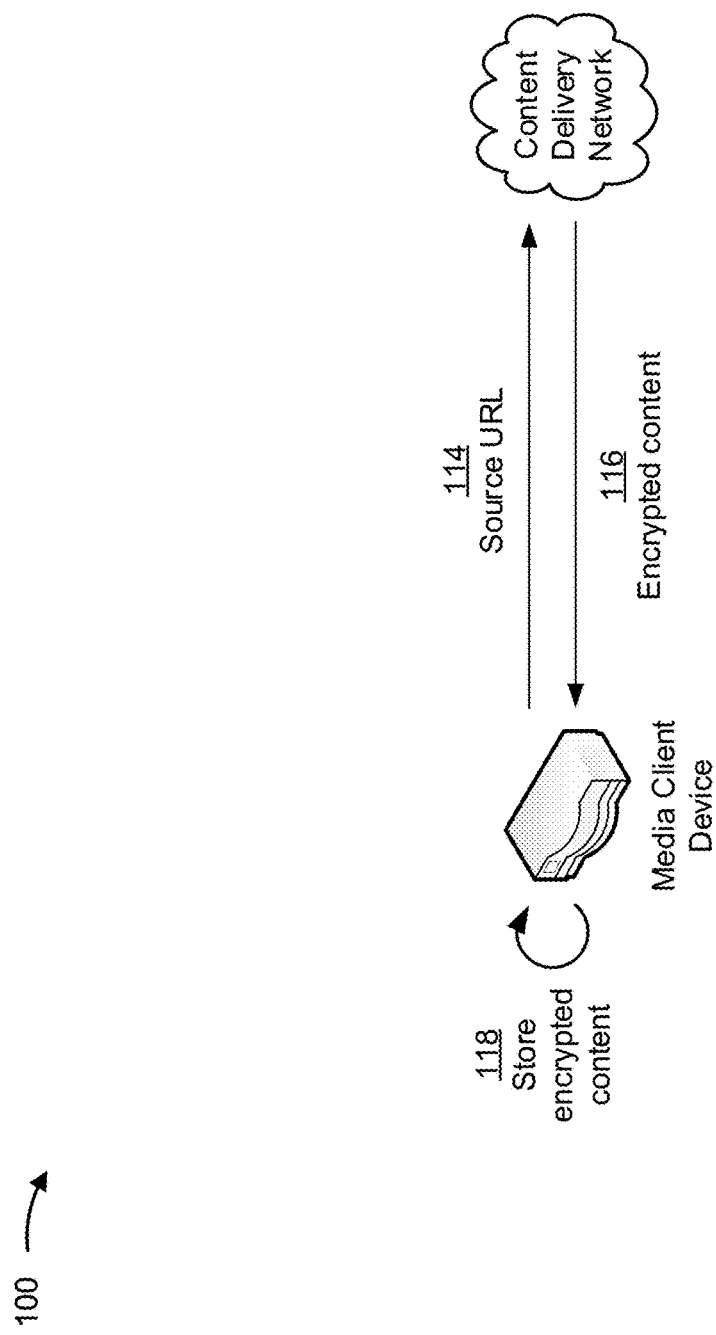

As shown in FIG. 1C, and by reference number 114, the media client device (e.g., via the middleware layer, via the DVR application, via the application layer, using the browser, and/or the like) may provide the source URL to the content delivery network. In some implementations, the media client device may provide the source URL via an IP communication session. For example, the media client device, using the browser, may establish a Media Source Extensions (MSE) session with the content delivery network. In some implementations, the MSE session may permit a JavaScript application to send byte streams to media codecs within the browser and/or allow the implementation of client-side prefetching and buffering of code for streaming media (e.g., the content) entirely in JavaScript.

In some implementations, the media client device may establish a secure session with the content delivery network (e.g., via an IP communication session). In some implementations, the media client device (e.g., via the middleware layer, via the DVR application, via the application layer, using the browser, and/or the like) may use Hypertext Transfer Protocol Secure (HTTPS) to communicate with the content delivery network and establish the secure session. In some implementations, the media client device may use a client (e.g., an MPEG-DASH client, and/or the like) and/or a player (e.g., a dashjs player, a Shaka player, and/or the like) embedded in the browser to establish the secure session.

In some implementations, the content delivery network may be a network and/or system of distributed servers that provide content to media client devices, based on the geographic locations of the media client devices, the origin of the content being accessed, and/or the geographic location of a content delivery server device in the content delivery network providing the content. For example, the content delivery network may include a network of servers geographically distributed and owned and/or operated by the television service provider.

As shown in FIG. 1C, and by reference number 116, the content delivery network may provide, to the media client device, encrypted content. In some implementations, the content delivery network may also provide, to the media client device, content information, such as a header, whether playing the content requires a license, and/or the like. The content delivery network may provide the encrypted content and/or content information via the IP communication session (e.g., the MSE session and/or the secure session). For example, the media client device (e.g., via the application layer) may use a Hypertext Transfer Protocol (HTTP) to download the encrypted content and/or content information from the content delivery network. In some implementations, the media client device may use an MPEG-DASH client and/or a player to download the encrypted content.

In some implementations, the content delivery network may provide, to the media client device, multiple copies of the encrypted content, where each copy has a different bitrate. For example, the media client device, using an MPEG-DASH client with adaptive bitrate streaming, may receive encrypted content. Using adaptive bitrate streaming, the MPEG-DASH client may detect the bandwidth available to download the encrypted content and adjust the bitrate (e.g., the quality and/or the like) of the downloaded encrypted content such that when the content is streamed and/or displayed very little buffering and/or delay occurs. In some implementations, the media client device may download multiple copies of the encrypted content having different bitrates regardless of the bandwidth available. In this way, when the stored encrypted content is played, the MPEG-DASH client may select a copy and/or switch between the multiple copies to reduce buffering and/or delays in playback.

In some implementations, when the media client device downloads multiple copies of the encrypted content having different bitrates regardless of the bandwidth available, the duration of time taken to download a copy of the encrypted content may exceed the playback duration of the encrypted content (e.g., due to a lower bandwidth, connection problems, and/or the like). In such circumstances, the media client device may use presentation timestamps (PTSs) and/or program clock references (PCRs) to achieve synchronization of the downloaded copies when playing back the content.

In some implementations, the media client device may receive, from the content delivery network, at least two copies of the encrypted content (e.g., a first copy having a first bitrate, a second copy having a second bitrate, a third copy having a third bitrate, and/or the like). For example, the media client device may receive a first copy having the highest bitrate available (e.g., a high bitrate copy and/or the like) and a second copy having the lowest bitrate available (e.g., a low bitrate copy and/or the like). By receiving a copy having the highest bitrate available and a copy having the lowest bitrate available, the media client device may conserve storage space on the memory, while still permitting the player (e.g., the MPEG-DASH client and/or the like) to perform adaptive bitrate streaming during playback to reduce buffering and/or delays in playback.

As shown in FIG. 1C, and by reference 118, the media client device may store the encrypted content (e.g., in memory of the client device, in memory, such as a hard drive, connected to the media client device (e.g., via an in-home network, a business network, a multimedia over coax alliance (MoCA), and/or the like), and/or the like). In some implementations, the media client device stores the encrypted content as the media client device streams and/or downloads the encrypted content from the content delivery network.

In some implementations, the media client device, using the platform layer, may provide information regarding the storage space in the memory. For example, the platform layer may include an application programming interface (API) that provides (e.g., to the middleware layer, to the application layer, to the display device, and/or the like) information, such as storage space consumed by the stored encrypted content, storage space consumed by IP-based stored encrypted content, storage space consumed by QAM-based stored content, overall storage space consumed, storage space available, and/or the like. Additionally, or alternatively, the platform layer may designate a partition for storing IP-based content, and may provide input/output access rights to the partition.

Figure 1D:
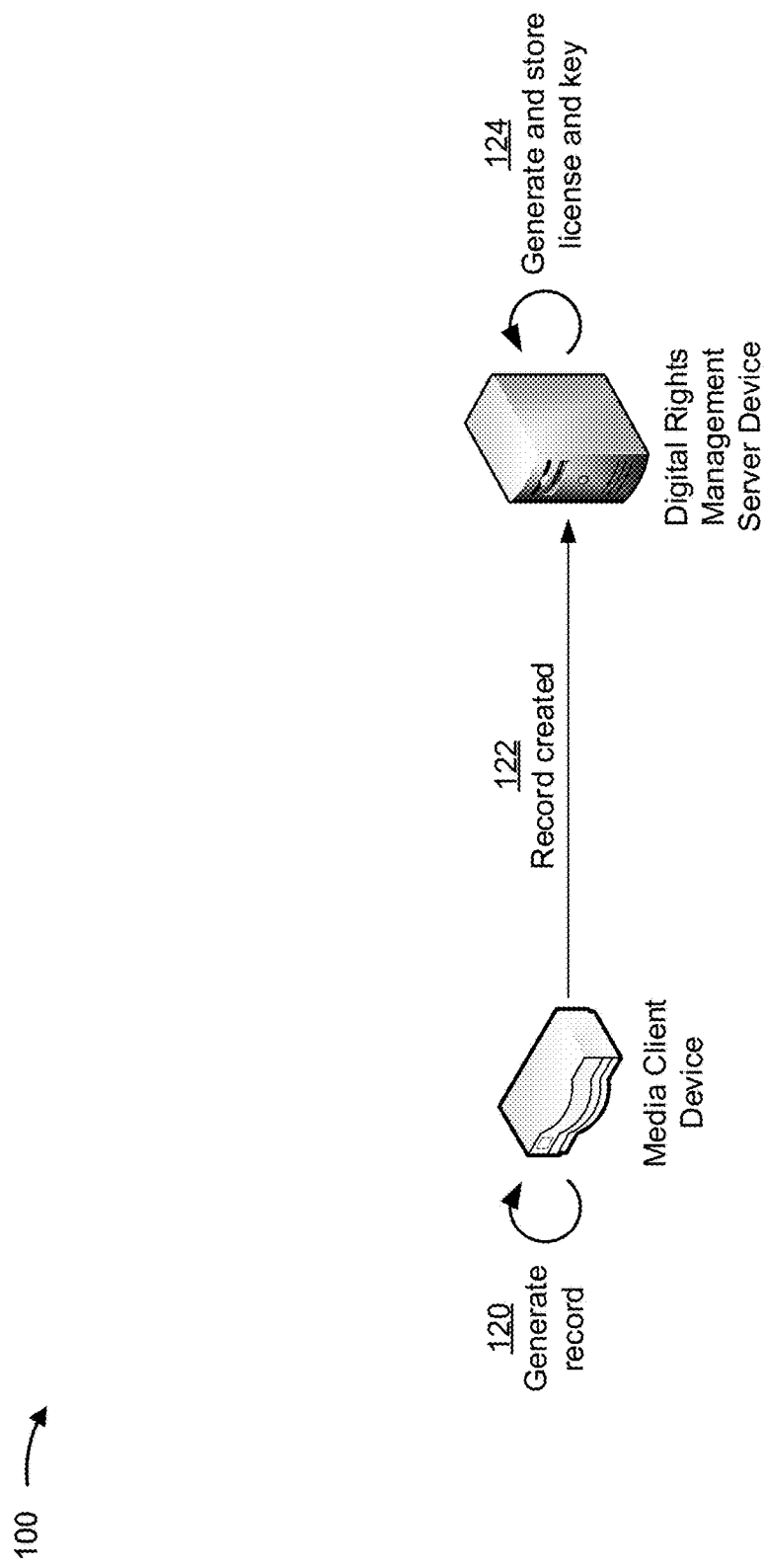

As shown in FIG. 1D, and by reference number 120, the media client device may generate a record of the stored encrypted content. For example, the media client device may generate information regarding the encrypted content (e.g., a DVR record, a Media Presentation Description (MPD) extensible markup language (XML) document for the encrypted content, and/or the like).

In some implementations, the media client device may process (e.g., via the application layer, using the browser, and/or the like) the content information provided by the content delivery network. In some implementations, the media client device may process the content information to determine whether playing the content requires a license. In some implementations, if the media client device determines that playing the content does not require a license, the media client may wait for a playback request before taking further action with respect to the content.

In some implementations, the media client device may determine that playing the content does require a license, and may, as shown in FIG. 1D, and by reference number 122, provide information indicating that the record was created to the digital rights management server device. For example, the information may include information regarding the encrypted content (e.g., a DVR record, a Media Presentation Description (MPD) extensible markup language (XML) document for the encrypted content, and/or the like), the device identifier, and/or the like. In some implementations, the media client device may provide the information regarding the encrypted content to the DRM server device via an IP communication session.

As shown in FIG. 1D, and by reference number 124, the DRM server device may generate and store a license and a key based on the information provided by the media client device. For example, the DRM server device may generate and store a license and a key to decrypt the encrypted content for the media client device based on the device identifier.

Figure 1E:
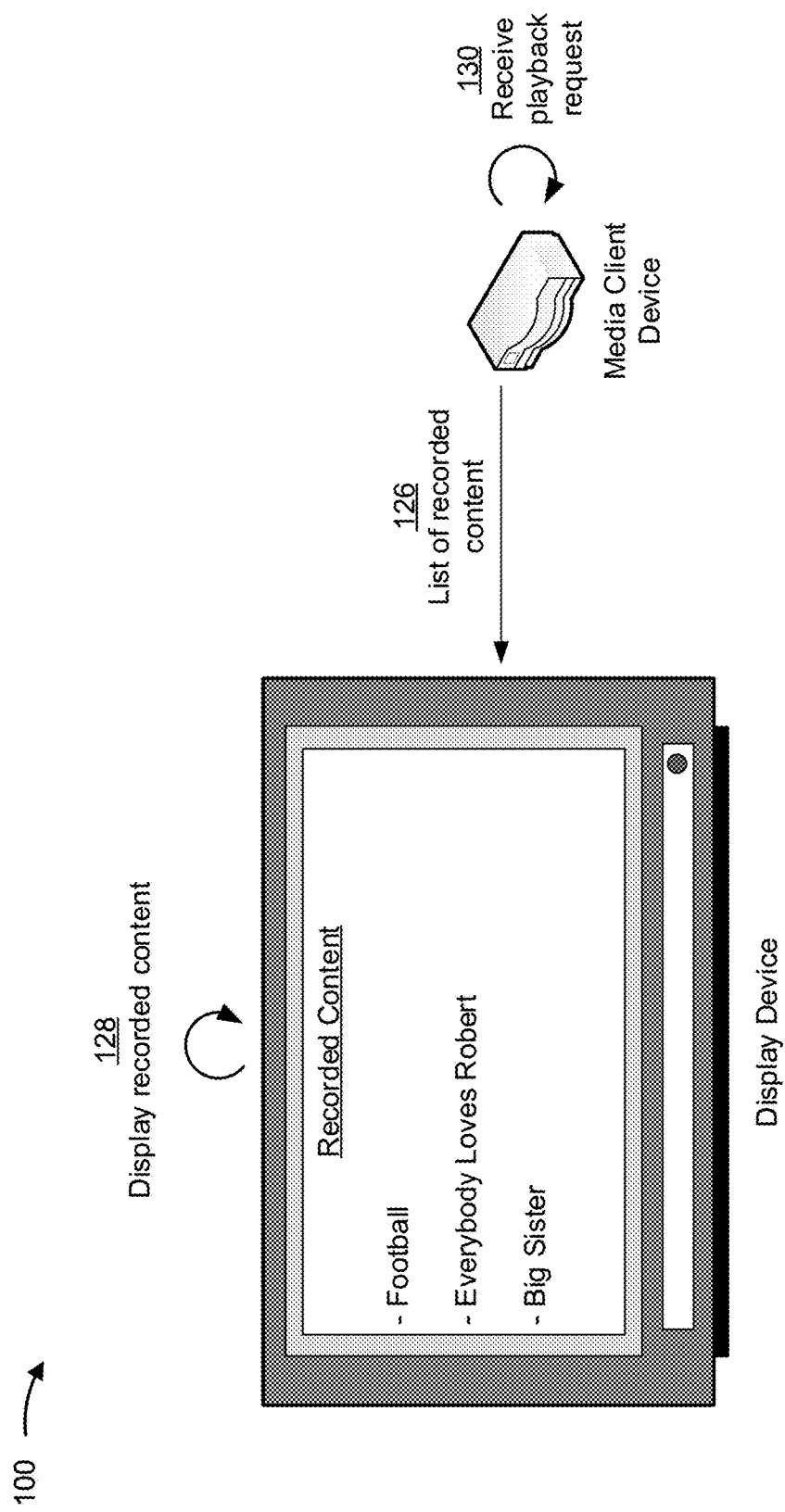

As shown in FIG. 1E, and by reference number 126, the media client device may provide, to the display device, a list of recorded content. For example, the media client device may generate the list of recorded content based on the information regarding the encrypted content (e.g., a DVR record, a Media Presentation Description (MPD) extensible markup language (XML) document for the encrypted content, and/or the like) generated by the media client device, the content information provided by the content delivery network, and/or the like.

As shown in FIG. 1E, and by reference number 128, the display device may display the recorded content. For example, the display device may display the list of recorded content provided by the media client device. In some implementations, the display device may display the recorded content in groups based on a type of the recorded content (e.g., a group of QAM recordings, a group of IP recordings, and/or the like). For example, the display device may first display either the group of QAM recordings or the group of IP recordings based on the quantity of each type of recording, based on what the user typically watches on a given day and/or within a give time period of the day, based on which group has the most recent recordings, based on user-selected preferences, based on aggregated data from a plurality of users indicating that content within one of the groups is more preferred by users than the other, and/or the like.

As shown in FIG. 1E, and by reference number 130, the media client device may receive a playback request. In some implementations, the media client device may receive the playback request via an input button (e.g., a physical button on the media client device, a physical button on a remote control associated with the media client device, a user interface associated with the media client device, and/or the like), a voice command (e.g., received via a microphone and/or the like), and/or the like. For example, the user may select recorded content from the displayed list of recorded content using a remote control and press a button, and the remote control may communicate the selection to the media client device.

In some implementations, the display device may receive the playback request via an input button (e.g., a physical button on the display device, a physical button on a remote control associated with the display device, a virtual button on a touchscreen of the display device, a user interface associated with the display device, and/or the like), a voice command (e.g., received via a microphone and/or the like), and/or the like. The display device may provide the playback request to the media client device.

Figure 1F:
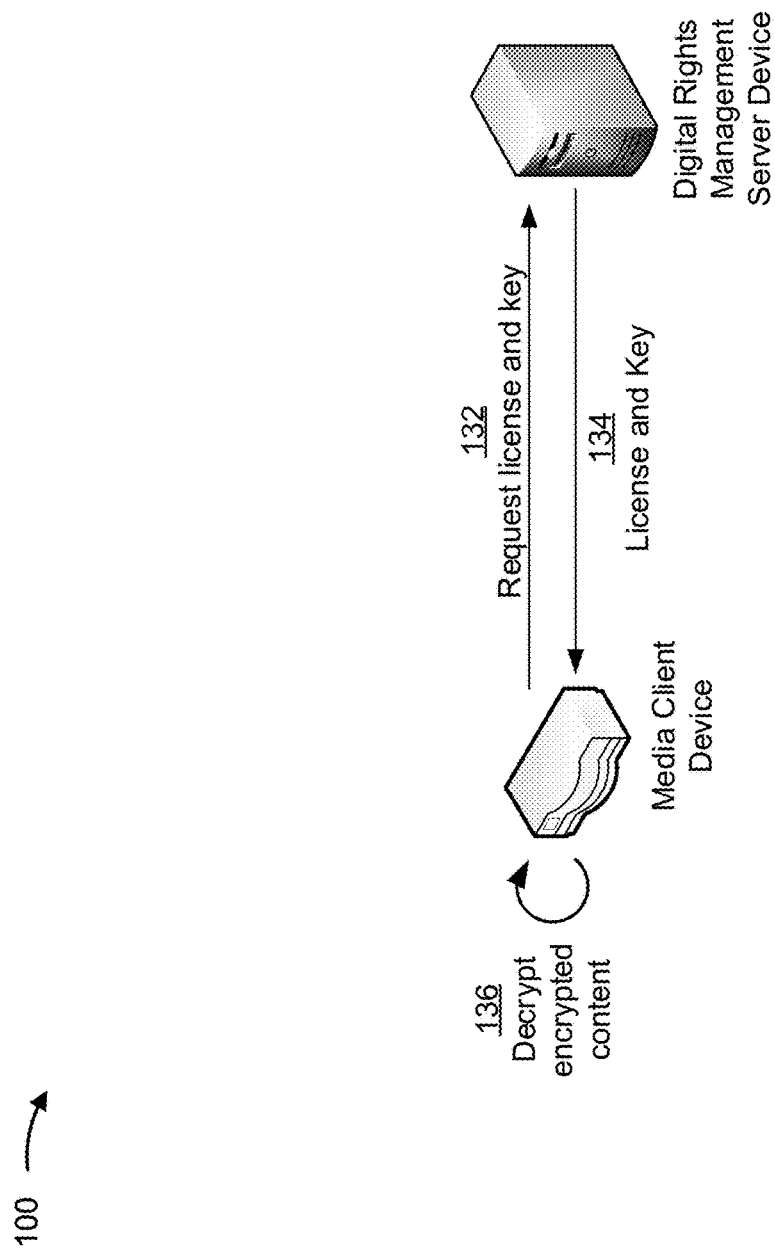

As shown in FIG. 1F, and by reference number 132, the media client device may provide, to the DRM server device, a request for the license and the key. For example, the request for the license and the key may include information regarding the encrypted content, the device identifier, and/or the like. In some implementations, the media client device may provide the request for the license and the key to the DRM server device via an IP communication session.

For example, the media client device (e.g., via the application layer, using the browser, and/or the like) may establish an Encrypted Media Extensions (EME) session with the DRM server device. In some implementations, the EME session may provide a communication channel between the browser and DRM software on the DRM server device. The EME session may allow the use of HTML5 (the fifth major revision of Hypertext Markup Language (HTML)) video to play digital-rights-management-wrapped content without using third-party media plugins and may enable adaptive bitrate streaming in HTML5 (e.g., using MPEG-DASH, and/or the like) with Motion Picture Experts Group Common Encryption (MPEG-CENC) protected content.

As shown in FIG. 1F, and by reference number 134, the DRM server device may provide the license and the key to the media client device. In some implementations, the license may include parameters, such as a time period during which the media client device may access, play, and/or store the content, a number of times the media client device may access, play, and/or store the content, permission for the media client device to transmit the content to another media client device, and/or the like. The license and/or the key may permit the media client device to access and/or decrypt the encrypted content (e.g., MPEG-CENC protected content, and/or the like). In some implementations, the DRM server device may provide the license and the key to the media client device via an IP communication session, such as an EME session.

As shown in FIG. 1F, and by reference number 136, the media client device may decrypt the encrypted content stored in the memory. For example, the media client device may use the license and/or the key to decrypt the encrypted content to obtain the content.

Figure 1G:
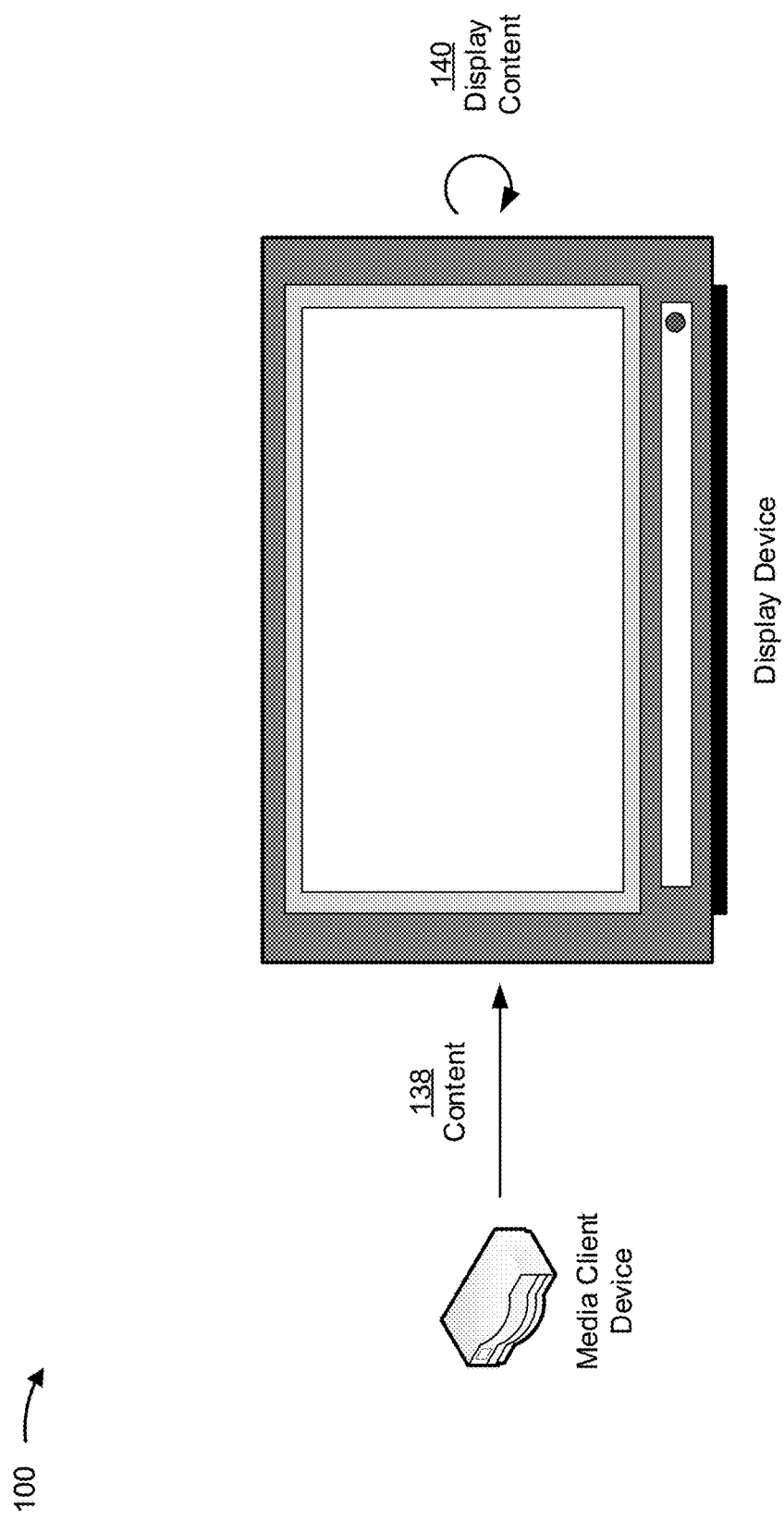

As shown in FIG. 1G, and by reference number 138, the media client device may provide the content to the display device. In some implementations, the media client device may use a client (e.g., an MPEG-DASH client, and/or the like) and/or a player (e.g., a dashjs player, a Shaka player, and/or the like) embedded in the browser to stream the content to the display device. For example, the media client device, using the browser, may render the content for display and stream the content to the display device.

As shown in FIG. 1G, and by reference number 140, the display device may display the content. In some implementations, the display device and/or the media client device may receive interactions from the user (e.g., via a remote control, voice command, and/or the like) to control, adjust, change, and/or the like the manner in which the content is displayed, streamed, and/or the like. For example, the user may send a command to the display device and/or the media client device to fast-forward, rewind, pause, restart, and/or the like the content, and the media client device may change the stream of content accordingly.

In some implementations, the media client device may open a second, third, and/or any number of instances of the player embedded in the browser to concurrently receive and/or store content over multiple IP channels. For example, the media client device may concurrently receive content over multiple IP channels and store the streams of media content in the memory. Additionally, or alternatively, the media client device may concurrently stream content over multiple IP channels and provide the streams of media content to the display device for display in different portions of the display device. In some implementations, the media client device may provide one or more streams of media content to the display device for display and concurrently store one or more other streams of media content for playback at another time. Additionally, or alternatively, the media client device may be connected to multiple display devices and may provide one or more channels of media content (e.g., streamed from the content delivery network, played back from memory, and/or the like) to each of the multiple display devices (e.g., the same media content to each of the multiple display devices, different media content to each of the multiple display devices, and/or the like).

Additionally, or alternatively, the media client device may concurrently play and/or store one or more QAM channels and one or more IP channels. For example, the media client device (e.g., using the middleware layer) may play and/or store content from one or more QAM channels and (e.g., using the middleware layer, using the application layer, the browser, the player, and/or the like) may play and/or store content from one or more IP channels.

As indicated above, FIGS. 1A-1G are provided as one or more examples. Other examples can differ from what is described with regard to FIGS. 1A-1G.

Figure 2:
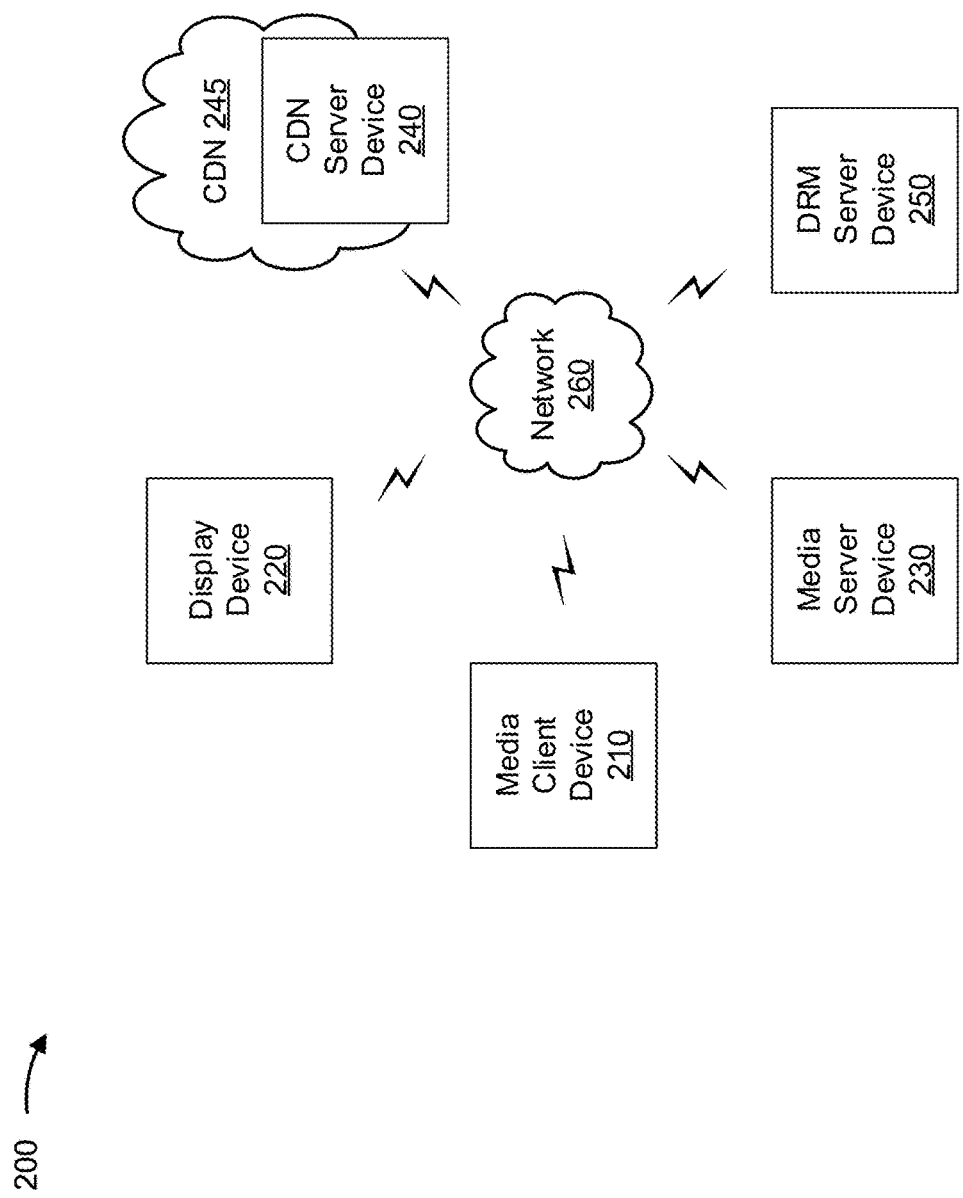
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include a media client device 210, a display device 220, a media server device 230, a content delivery network (CDN) server device 240, a CDN 245, a digital rights management (DRM) server device 250, and a network 260. Devices of environment 200 may interconnect via wired connections, wireless connections, or a combination of wired and wireless connections.

Media client device 210 includes one or more devices capable of receiving, transmitting, storing, and/or processing multimedia content and providing the multimedia content to a user (e.g., via display device 220). Examples of media client device 210 may include a set-top box, a casting stick (e.g., a high-definition media interface (HDMI) dongle), a computer, a cable card, a gaming device, a portable electronic device, and/or another type of device capable of receiving, transmitting, storing, and/or processing multimedia content and providing the multimedia content to a user.

Display device 220 includes any digital or analog display that is capable of presenting audio and/or video content provided by media client device 210. Display device 220 may include technologies, such as cathode ray tube (CRT) displays, liquid crystal displays (LCDs), light-emitting diode (LED) displays, plasma displays, and/or the like. Examples of display device 220 may include a television, a projector, a computer monitor, and/or another type of device capable of presenting audio and/or video content.

Media server device 230 includes one or more devices capable of receiving, generating, storing, processing, and/or providing information associated with television service providers, channel identifiers, source URLs, device identifiers, channel packages, user subscriptions, promotions, and/or the like. Examples of media server device 230 may include a server device (e.g., connected to a data structure storing information) operated by the television service provider and/or a manufacturer of the media client device, a network of computing devices and/or server devices (e.g., connected to a data structure storing information) operated by the television service provider and/or the manufacturer of the media client device, and/or the like. In some implementations, media server device 230 may include a communication interface that allows media server device 230 to receive information from and/or transmit information to other devices in environment 200.

CDN server device 240 includes one or more devices capable of receiving, generating, storing, processing, and/or providing information associated with multimedia content, television service providers, channel identifiers, source URLs, and/or device identifiers. Examples of CDN server device 240 may include a server device (e.g., connected to a data structure storing information) operated by the television service provider and/or a content provider, a network of computing devices and/or server devices (e.g., connected to a data structure storing information) operated by the television service provider and/or the content provider, and/or the like. In some implementations, CDN server device 240 may include a communication interface that allows CDN server device 240 to receive information from and/or transmit information to other devices in environment 200.

CDN 245 includes one or more networks (e.g., wired and/or wireless networks), data centers, server devices (e.g., CDN server device 240), and/or the like capable of receiving, generating, storing, processing, and/or providing information associated with multimedia content, television service providers, channel identifiers, source URLs, and/or device identifiers.

DRM server device 250 includes one or more devices capable of receiving, generating, storing, processing, and/or providing information associated with multimedia content, television service providers, licenses, encryption keys, and/or the like. Examples of DRM server device 250 may include a server device (e.g., connected to a data structure storing information) operated by the television service provider and/or a digital rights management service provider, a network of computing devices and/or server devices (e.g., connected to a data structure storing information) operated by the television service provider and/or the digital rights management service provider, and/or the like. In some implementations, DRM server device 250 may include a communication interface that allows DRM server device 250 to receive information from and/or transmit information to other devices in environment 200.

Network 260 includes one or more wired and/or wireless networks. For example, network 260 may include a fiber optic-based network, an intranet, the Internet, a cloud computing network, a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
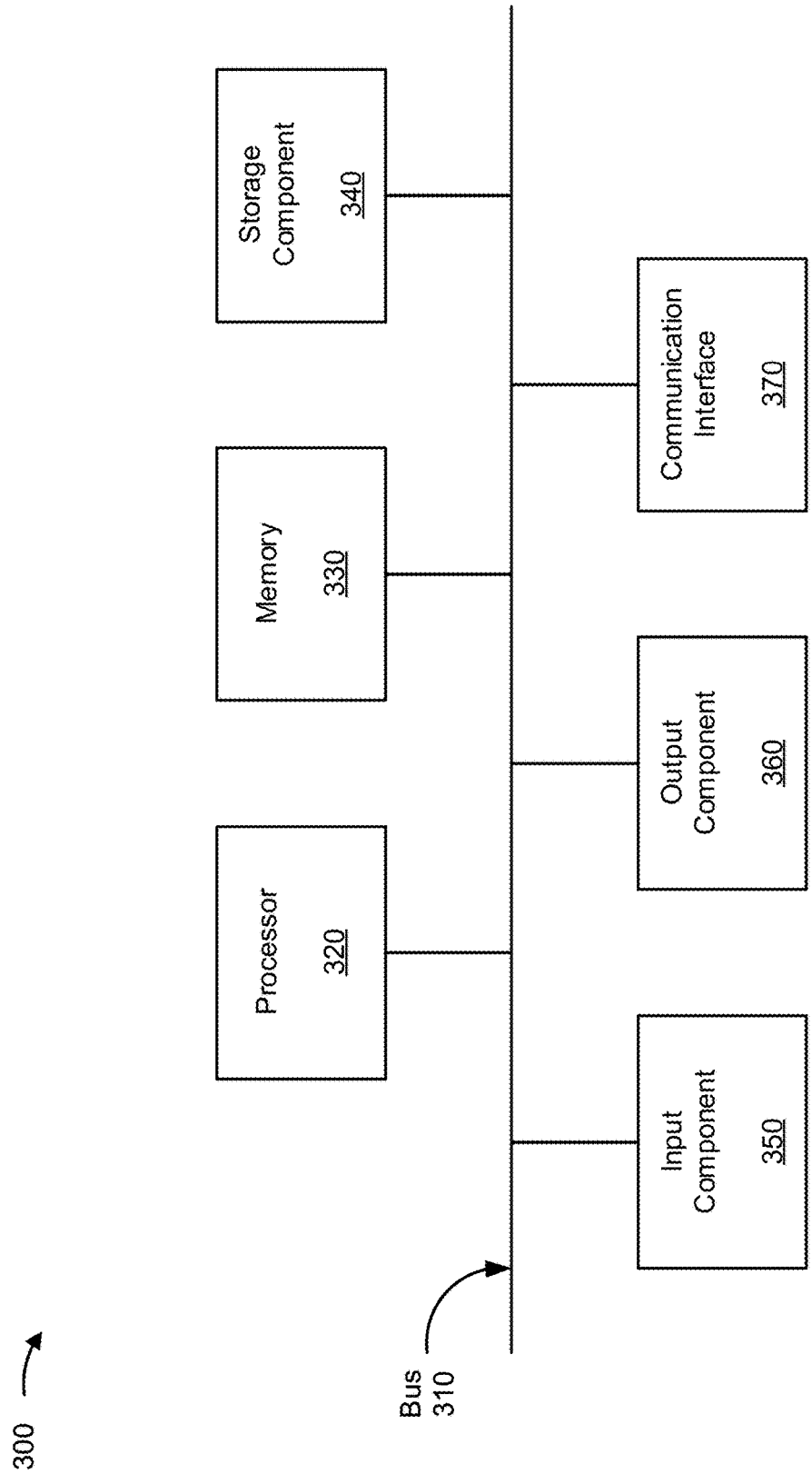
FIG. 3 is a diagram of example components of one or more devices of FIG. 2.

FIG. 3 is a diagram of example components of a device 300. Device 300 may correspond to media client device 210, display device 220, media server device 230, CDN server device 240, and/or DRM server device 250. In some implementations, media client device 210, display device 220, media server device 230, CDN server device 240, and/or DRM server device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RANI), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
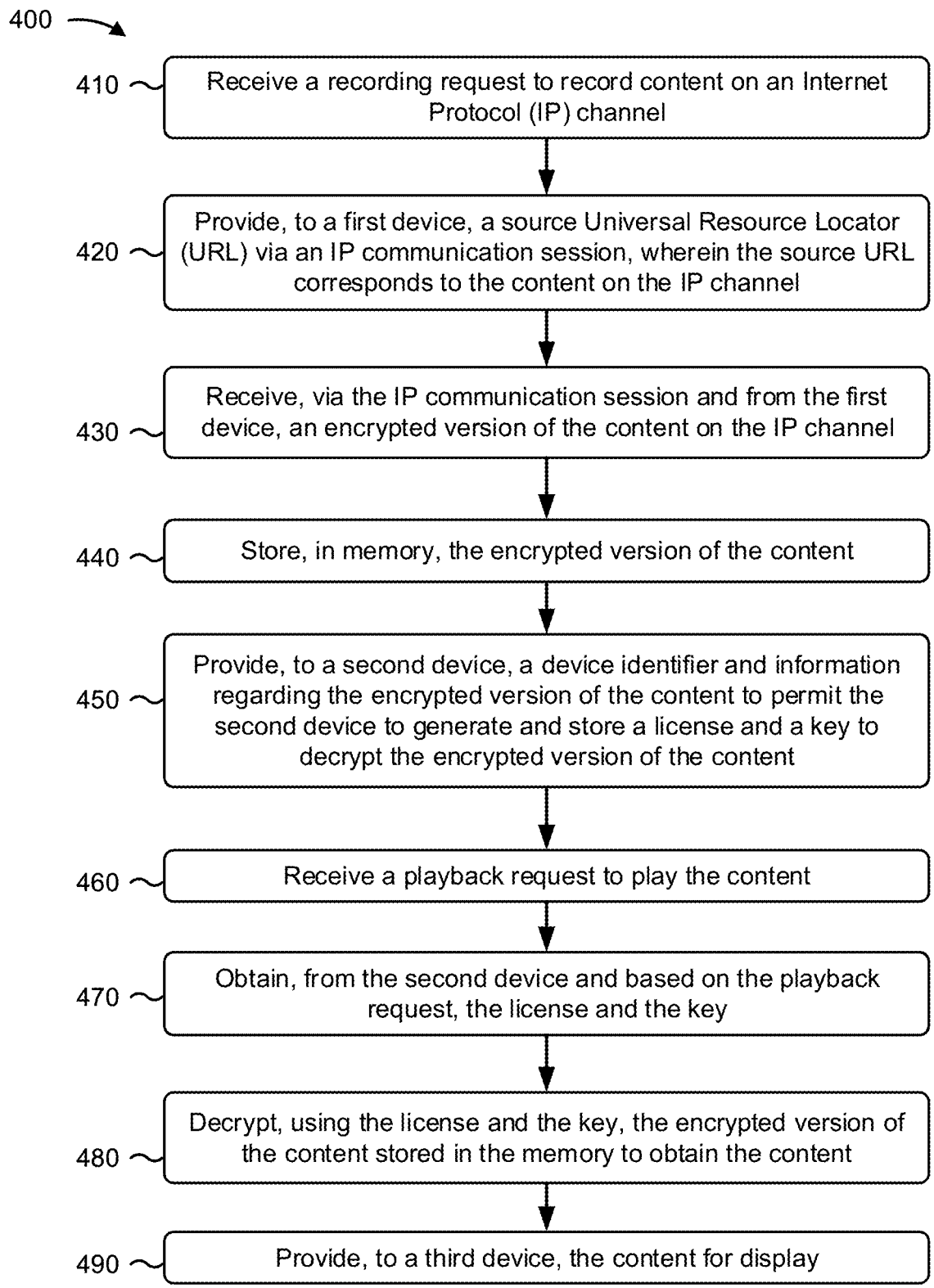
FIG. 4 is a flow chart of an example process for storing digital video content from an Internet Protocol (IP) channel for playback.

FIG. 4 is a flow chart of an example process 400 for receiving a recording request to record content on an IP channel, tuning to an IP channel, receiving content via the IP channel, storing the content, obtaining a license and a key for the content, and providing the content for display. In some implementations, one or more process blocks of FIG. 4 may be performed by a media client device (e.g., media client device 210). In some implementations, one or more process blocks of FIG. 4 may be performed by another device or a group of devices separate from or including the media client device, such as a display device (e.g., display device 220), a media server device (e.g., media server device 230), a CDN server device (e.g., CDN server device 240), a DRM server device (e.g., DRM server device 250), and/or the like.

As shown in FIG. 4, process 400 may include receiving a recording request to record content on an Internet Protocol (IP) channel (block 410). For example, the media client device (e.g., using processor 320, memory 330, storage component 340, input component 350, output component 360, communication interface 370, and/or the like) may receive a recording request to record content on an Internet Protocol (IP) channel, as described above. In some implementations, the media client device includes a memory and is capable of processing Quadrature Amplitude Modulation (QAM) channels and IP channels. For example, the media client device may include at least one QAM tuner (e.g., at least two QAM tuners, at least four QAM tuners, at least six QAM tuners, and/or at least seven QAM tuners).

As further shown in FIG. 4, process 400 may include providing, to a first device, a source Universal Resource Locator (URL) via an IP communication session, wherein the source URL corresponds to the content on the IP channel (block 420). For example, the media client device (e.g., using processor 320, memory 330, storage component 340, input component 350, output component 360, communication interface 370, and/or the like) may provide, to a first device, a source Universal Resource Locator (URL) via an IP communication session, as described above. In some implementations, the source URL corresponds to the content on the IP channel. In another example, process 400 may include providing, to the first device, a source URL to permit middleware to establish an IP communication session. In yet another example, the middleware may run a Motion Picture Experts Group—Dynamic Adaptive Streaming of Hypertext Transfer Protocol (MPEG-DASH) client. In some implementations, the IP communication session includes a Media Source Extensions (MSE) session.

As further shown in FIG. 4, process 400 may include receiving, via the IP communication session and from the first device, an encrypted version of the content on the IP channel (block 430). For example, the media client device (e.g., using processor 320, memory 330, storage component 340, input component 350, output component 360, communication interface 370, and/or the like) may receive, via the IP communication session and from the first device, an encrypted version of the content on the IP channel, as described above. In some implementations, process 400 may include receiving a first copy of the encrypted version of the content and a second copy of the encrypted version of the content. For example, the first copy of the encrypted version of the content and the second copy of the encrypted version of the content may have different bitrates.

As further shown in FIG. 4, process 400 may include storing, in the memory, the encrypted version of the content (block 440). For example, the media client device (e.g., using processor 320, memory 330, storage component 340, input component 350, output component 360, communication interface 370, and/or the like) may store, in memory, the encrypted version of the content, as described above.

As further shown in FIG. 4, process 400 may include providing, to a second device, a device identifier and information regarding the encrypted version of the content to permit the second device to generate and store a license and a key to decrypt the encrypted version of the content (block 450). For example, the media client device (e.g., using processor 320, memory 330, storage component 340, input component 350, output component 360, communication interface 370, and/or the like) may provide, to a second device, a device identifier (e.g., for the media client device) and information regarding the encrypted version of the content to permit the second device to generate and store a license and a key to decrypt the encrypted version of the content, as described above. In another example, process 400 may include, generating a Media Presentation Description (MPD) extensible markup language (XML) document for the encrypted version of the content as the information regarding the encrypted version of the content.

As further shown in FIG. 4, process 400 may include receiving a playback request to play the content (block 460). For example, the media client device (e.g., using processor 320, memory 330, storage component 340, input component 350, output component 360, communication interface 370, and/or the like) may receive a playback request to play the content, as described above.

As further shown in FIG. 4, process 400 may include obtaining, from the second device and based on the playback request, the license and the key (block 470). For example, the media client device (e.g., using processor 320, memory 330, storage component 340, input component 350, output component 360, communication interface 370, and/or the like) may obtain, from the second device and based on the playback request, the license and the key, as described above. In some implementations, process 400 may include, when obtaining the license and the key, permitting middleware to establish an Encrypted Media Extensions (EME) session.

As further shown in FIG. 4, process 400 may include decrypting, using the license and the key, the encrypted version of the content stored in the memory to obtain the content (block 480). For example, the media client device (e.g., using processor 320, memory 330, storage component 340, input component 350, output component 360, communication interface 370, and/or the like) may decrypt, using the license and the key, the encrypted version of the content stored in the memory to obtain the content, as described above.

As further shown in FIG. 4, process 400 may include providing, to a third device, the content for display (block 490). For example, the media client device (e.g., using processor 320, memory 330, storage component 340, input component 350, output component 360, communication interface 370, and/or the like) may provide, to a third device, the content for display, as described above. In some implementations, process 400 may include rendering, via a browser application, the content for display. For example, the browser application may run a Motion Picture Experts Group—Dynamic Adaptive Streaming of Hypertext Transfer Protocol (MPEG-DASH) client (e.g., a dashjs player, a Shaka player, and/or the like).

In another example, process 400 may include, when receiving the encrypted version of the content on the IP channel, receiving other content on a QAM channel and providing the other content for display.

In yet another example, process 400 may include, when receiving the encrypted version of the content on the IP channel, receiving other content on a QAM channel and storing the other content in the memory.

In yet another example, process 400 may include, when receiving the encrypted version of the content on the IP channel, receiving other content on another IP channel and providing the other content for display.

In yet another example, process 400 may include, generating, based on the recording request, a start trigger to begin recording and a stop trigger to end recording, and providing a URL request for the source URL based on the start trigger.

Process 400 may include additional implementations, such as any single implementation or any combination of implementations described below and/or in connection with one or more other processes described elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a media client device, a recording request to record content, wherein the media client device includes a memory and is capable of processing Quadrature Amplitude Modulation (QAM) channels and Internet Protocol (IP) channels;
   providing, by the media client device, a request for a source Universal Resource Locator (URL) that includes at least one of a channel identifier associated with a channel identified by the recording request and a device identifier associated with the media client device;
   causing, by the media client device and based on the channel identifier and the device identifier, verification that the media client device is authorized to access the channel;
   receiving, by the media client device, the source URL that is uniquely tokenized to the media client device,
      wherein the source URL indicates whether the source URL corresponds to a QAM channel or an IP channel;
   determining, by the media client device and based on the source URL, that the source URL corresponds to the IP channel;
   providing, by the media client device and to a first device, the source URL via an IP communication session;
   receiving, by the media client device, via the IP communication session, and from the first device, an encrypted version of the content,
      wherein the media client device concurrently receives another content via the QAM channel;
   storing, by the media client device and in the memory, the encrypted version of the content;
   providing, by the media client device and to a second device, the device identifier and information regarding the encrypted version of the content to permit the second device to generate and store a license and a key to decrypt the encrypted version of the content;
   displaying, by the media client device, based on whether the content was received via the IP communication session or the QAM channel, and based on information associated with what a user typically watches on a particular day, the content and the other content in an IP channel group and a QAM channel group respectively;
   receiving, by the media client device, a playback request to play the content;
   obtaining, by the media client device, from the second device, and based on the playback request, the license and the key;
   decrypting, by the media client device and using the license and the key, the encrypted version of the content stored in the memory to obtain the content; and
   providing, by the media client device and to a third device, the content for display.

2. The method of claim 1, wherein receiving the encrypted version of the content comprises receiving a first copy of the encrypted version of the content and a second copy of the encrypted version of the content, and
   wherein the first copy of the encrypted version of the content and the second copy of the encrypted version of the content have different bitrates.

3. The method of claim 1, further comprising:
   generating a Media Presentation Description (MPD) extensible markup language (XML) document for the encrypted version of the content as the information regarding the encrypted version of the content.

4. The method of claim 1, comprising:
   generating, based on the recording request, a start trigger to begin recording and a stop trigger to end recording; and
   providing a URL request for the source URL based on the start trigger.

5. The method of claim 1, wherein the content is first content,
   the method further comprising:
   opening one or more instances of a player application associated with a browser application,
      wherein the one or more instances of the player application concurrently receive one or more content, including the first content, over one or more of the IP channels that include the IP channel; and
   providing different content, of the one or more content, to different portions of the third device.

6. The method of claim 1, further comprising:
   establishing an Encrypted Media Extensions (EME) session with the second device,
      wherein the EME session establishes a communication channel between a browser application of the media client device and the second device.

7. The method of claim 1, wherein displaying the content and the other content in the IP channel group and the QAM channel group respectively further comprises:
   displaying the IP channel group first or the QAM channel group first based on at least one of:
      a first quantity of content of the IP channel group and a second quantity of content of the QAM channel group,
      typical behavior of a user associated with the media client device, or
      a time period of a day.

8. A media client device, comprising:
   one or more memories; and
   one or more processors, communicatively coupled to the one or more memories, configured to:

receive a recording request to record content;
provide a source Universal Resource Locator (URL) request that includes at least one of a channel identifier associated with a channel identified by the recording request and a device identifier associated with the media client device;
cause, based on the channel identifier and the device identifier, verification that the media client device is authorized to access the channel;
receive the source URL that is uniquely tokenized to the media client device,
  wherein the source URL indicates whether the source URL corresponds to a Quadrature Amplitude Modulation (QAM) channel or an Internet Protocol (IP) channel;
determine, based on the source URL, that the source URL corresponds to the IP channel;
provide, to a first device, the source URL to permit middleware of the media client device to establish an IP communication session;
receive, via the IP communication session and from the first device, an encrypted version of the content,
  wherein another content is received concurrently via the QAM channel;
store, in the one or more memories, the encrypted version of the content;
provide, to a second device, the device identifier and information regarding the encrypted version of the content to permit the second device to generate and store a license and a key to decrypt the encrypted version of the content;
display, based on whether the content was received via the IP communication session or the QAM channel, and based on information associated with what a user typically watches on a particular day, the content and the other content in an IP channel group and a QAM channel group respectively;
receive a playback request to play the content;
obtain, from the second device and based on the playback request, the license and the key;
decrypt, using the license and the key, the encrypted version of the content stored in the one or more memories to obtain the content; and
render, via a browser application, the content for display.

9. The media client device of claim 8, wherein the middleware runs a Motion Picture Experts Group Dynamic Adaptive Streaming of Hypertext Transfer Protocol (MPEG-DASH) client.

10. The media client device of claim 8, wherein the IP communication session includes a Media Source Extensions (MSE) session.

11. The media client device of claim 8, wherein the one or more processors, when obtaining the license and the key, are configured to permit the middleware to establish an Encrypted Media Extensions (EME) session.

12. The media client device of claim 8, wherein the browser application runs a Motion Picture Experts Group Dynamic Adaptive Streaming of Hypertext Transfer Protocol (MPEG-DASH) client.

13. The media client device of claim 12, wherein the MPEG-DASH client includes a dashjs player and/or a Shaka player.

14. The media client device of claim 8, wherein the one or more processors are configured to generate a Media Presentation Description (MPD) extensible markup language (XML) document for the encrypted version of the content as the information regarding the encrypted version of the content.

15. The media client device of claim 8, further comprising at least one QAM tuner.

16. A non-transitory computer-readable medium storing instructions, the instructions comprising:
one or more instructions that, when executed by one or more processors of a client device, cause the one or more processors to:
  receive a recording request to record first content;
  provide a source Universal Resource Locator (URL) request that includes at least one of a channel identifier associated with a channel identified by the recording request and a device identifier associated with the client device;
  cause, based on the channel identifier and the device identifier, verification that the client device is authorized to access the channel;
  receive the source URL that is uniquely tokenized to the client device,
    wherein the source URL indicates whether the source URL corresponds to a Quadrature Amplitude Modulation (QAM) channel or an Internet Protocol (IP) channel;
  determine, based on the source URL, that the source URL corresponds to a first IP channel;
  provide, to a first device, the source URL via a first IP communication session;
  receive, via the first IP communication session and from the first device, an encrypted version of the first content,
    wherein a second content is received concurrently via the QAM channel;
  store, in a memory, the encrypted version of the first content;
  provide, to a second device and while receiving the encrypted version of the first content, the device identifier and information regarding the encrypted version of the first content to permit the second device to generate and store a license and a key to decrypt the encrypted version of the first content;
  display, based on whether the content was received via the IP communication session or the QAM channel, and based on information associated with what a user typically watches on a particular day, the content and the other content in an IP channel group and a QAM channel group respectively;
  obtain, from the second device and based on a playback request, the license and the key;
  decrypt, using the license and the key, the encrypted version of the first content stored in the memory to obtain the first content; and
  render the first content for display.

17. The non-transitory computer-readable medium of claim 16, wherein the one or more instructions, that cause the one or more processors to receive the encrypted version of the first content, cause the one or more processors to receive a first copy of the encrypted version of the first content and a second copy of the encrypted version of the first content, and
  wherein the first copy of the encrypted version of the first content and the second copy of the encrypted version of the first content have different bitrates.

18. The non-transitory computer-readable medium of claim 16, wherein the one or more instructions, when executed by the one or more processors, further cause the one or more processors to generate a Media Presentation Description (MPD) extensible markup language (XML) document for the encrypted version of the first content as the information regarding the encrypted version of the content.

19. The non-transitory computer-readable medium of claim 16, wherein the one or more instructions, when executed by the one or more processors, further cause the one or more processors to:
  generate, based on the recording request, a start trigger to begin recording and a stop trigger to end recording; and
  provide a URL request for the source URL based on the start trigger.

20. The non-transitory computer-readable medium of claim 16, wherein the one or more instructions, when executed by the one or more processors, further cause the one or more processors to:
  open one or more instances of a player application associated with a browser application,
    wherein the one or more instances of the player application concurrently receive one or more content, including the first content, over one or more IP channels that include the first IP channel; and
  provide different content, of the one or more content, to different portions of a display associated with the client device.

* * * * *